US012068858B2

(12) United States Patent
Hong

(10) Patent No.: US 12,068,858 B2
(45) Date of Patent: Aug. 20, 2024

(54) METHOD FOR PERFORMING COMMUNICATION BY USING NON-TERRESTRIAL NETWORK, AND DEVICE THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 403 days.

(21) Appl. No.: 17/439,083

(22) PCT Filed: Mar. 10, 2020

(86) PCT No.: PCT/KR2020/003313
§ 371 (c)(1),
(2) Date: Sep. 14, 2021

(87) PCT Pub. No.: WO2020/189941
PCT Pub. Date: Sep. 24, 2020

(65) Prior Publication Data
US 2022/0158770 A1    May 19, 2022

(30) Foreign Application Priority Data

Mar. 15, 2019   (KR) .................. 10-2019-0029817
Mar. 9, 2020    (KR) .................. 10-2020-0029266

(51) Int. Cl.
*H04L 1/1812*   (2023.01)
*H04L 1/1607*   (2023.01)
(Continued)

(52) U.S. Cl.
CPC .......... *H04L 1/1812* (2013.01); *H04L 1/1671* (2013.01); *H04L 5/0055* (2013.01); *H04W 72/23* (2023.01); *H04W 84/06* (2013.01)

(58) Field of Classification Search
CPC ... H04L 1/1812; H04L 1/1671; H04L 5/0055; H04W 72/23; H04W 84/06
See application file for complete search history.

(56) References Cited

U.S. PATENT DOCUMENTS

2013/0242837 A1*  9/2013  Yang .................. H04L 1/1825
                                                     370/311
2014/0126512 A1   5/2014  Kim et al.
(Continued)

OTHER PUBLICATIONS

Interdigital Inc., "Deactivating HARQ for Non-Terrestrial Networks", R1-1804857, 3GPP TSG RAN WG1 Meeting #92bis, Sanya, China, Apr. 16-20, 2018, pp. 1-3.
(Continued)

*Primary Examiner* — Michael J Moore, Jr.
(74) *Attorney, Agent, or Firm* — IP Legal Services, LLC

(57) ABSTRACT

Provided is a method of a terminal for performing communication by using a non-terrestrial network (NTN). The method may include receiving, from a base station, HARQ operation activation indication information for indicating whether to activate an HARQ operation; configuring a HARQ process based on the HARQ operation enabling indication information; and identifying and controlling HARQ operations for a downlink signal according to whether the HARQ process configured whether to enable or disable the HARQ operation.

16 Claims, 17 Drawing Sheets

(51) Int. Cl.
*H04L 5/00* (2006.01)
*H04W 72/23* (2023.01)
*H04W 84/06* (2009.01)

(56) References Cited

U.S. PATENT DOCUMENTS

| | | | |
|---|---|---|---|
| 2016/0261391 A1* | 9/2016 | Chen | H04L 1/1861 |
| 2020/0044792 A1* | 2/2020 | Vaidya | H04L 47/34 |
| 2020/0228247 A1* | 7/2020 | Guo | H04W 52/383 |
| 2020/0228251 A1* | 7/2020 | Yeo | H04L 1/1822 |
| 2021/0314092 A1* | 10/2021 | Wen | H04L 1/1896 |
| 2021/0385020 A1* | 12/2021 | Määttänen | H04L 1/1893 |
| 2021/0391952 A1* | 12/2021 | Hofström | H04L 1/1864 |
| 2022/0007455 A1* | 1/2022 | Hong | H04W 84/06 |
| 2022/0045803 A1* | 2/2022 | Lin | H04L 1/1822 |
| 2022/0158770 A1* | 5/2022 | Hong | H04L 1/1671 |
| 2022/0240283 A1* | 7/2022 | Hong | H04L 5/0055 |

OTHER PUBLICATIONS

Nokia et al., "Consideration on HARQ Impact for NTN", R1-1805848, 3GPP TSG RAN WG1 Meeting #93, Busan, Korea, May 21-25, 2018, pp. 1-2.
Fraunhofer IIS et al., "NR-NTN: HARQ in Satellite Systems", R2-1817757, 3GPP TSG-RAN WG2 Meeting #104, Spokane, USA, Nov. 12-16, 2018, pp. 1-4.
ZTE Corporation et al., "Consideration on HARQ for NTN", R2-1900575, 3GPP TSG-RAN WG2 #105 Meeting, Athens, Greece, Feb. 25-Mar. 1, 2019, pp. 1-5.

* cited by examiner

FIG. 11

| Platforms | Altitude range | Orbit | Typical beam footprint size |
|---|---|---|---|
| Low-Earth Orbit (LEO) satellite | 300 – 1500 km | Circular around the earth | 100 – 500 km |
| Medium-Earth Orbit (MEO) satellite | 7000 – 25000 km | | 100 – 500 km |
| Geostationary Earth Orbit (GEO) satellite | 35 786 km | notional station keeping position fixed in terms of elevation/azimuth with respect to a given earth point | 200 – 1000 km |
| UAS platform (including HAPS) | 8 – 50 km (20 km for HAPS) | | 5 – 200 km |
| High Elliptical Orbit (HEO) satellite | 400 – 50000 km | Elliptical around the earth | 200 – 1000 km |

FIG. 14

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (on octet) |
| 59 | Long DRX Command |
| 60 | DRX Command |
| 61 | Timing Advance Command |
| 62 | UE Contention Resolution Identity |
| 63 | Padding |

FIG.15

| Index | LCID values |
|---|---|
| 0 | CCCH of size 64 bits (referred to as "CCCH1" in TS 38.331) |
| 1-32 | Identity of the logical channel |
| 33-51 | Reserved |
| 52 | CCCH of size 48 bits (referred to as "CCCH" in TS 38.331) |
| 53 | Recommended bit rate query |
| 54 | Multiple Entry PHR (four octets $C_i$) |
| 55 | Configured Grant Confirmation |
| 56 | Multiple Entry PHR (one octets $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

METHOD FOR PERFORMING COMMUNICATION BY USING NON-TERRESTRIAL NETWORK, AND DEVICE THEREFOR

CROSS REFERENCE TO RELATED APPLICATIONS

This application is a National Stage Patent Application of PCT International Patent Application No. PCT/KR2020/003313 (filed on Mar. 10, 2020) under 35 U.S.C. § 371, which claims priority to Korean Patent Application Nos. 10-2019-0029817 (filed on Mar. 15, 2019) and 10-2020-0029266 (filed on Mar. 9, 2020), the teachings of which are incorporated herein in their entireties by reference.

TECHNICAL FIELD

The disclosure relates techniques for performing communication using a non-terrestrial network between a user equipment (UE) and a base station.

BACKGROUND ART

The amount of data transmission and reception using wireless communication technology is increasing rapidly according to the increase in the spread of cellular phones and the like, and various types of wireless communication devices are introduced. In addition, as the importance of low latency is highlighted, development of a next-generation wireless communication technology (New RAT) after LTE technology is in progress.

In addition, the number of terminals (e.g., UEs) performing communication using the wireless communication technology is increasing abruptly, and there is a large demand for communication in various environments and locations. In this situation, it is necessary to provide a communication service with a further wider coverage and even in an environment where a base station connected by wire may not be established.

To this end, many researches have been conducted on non-terrestrial networks that are wirelessly linked to core networks in the air, not base stations built on the ground. The non-terrestrial network refers to a network or segment of a network that uses airborne vehicles such as HAPS (High Altitude Platform) or spaceborne vehicles such as satellites for transmission.

In the case of the non-terrestrial network, the distance between the terminal and the base station (e.g., network node, such as a satellite) is very long. Accordingly, it takes a relatively long time to transmit and receive data. In addition, the location of the cell may be continuously changed according to the movement of the spaceborne vehicle and the terminal. Therefore, when the HARQ feedback operation in the non-terrestrial network is performed as in the related art, the data transmission rate may be significantly reduced due to the propagation delay between the terminal and the satellite

DETAILED DESCRIPTION OF THE INVENTION

Technical Problem

The embodiments provide a method and an apparatus o perform communication using a non-terrestrial network between a user equipment (UE) and a base station.

Technical Solution

According to an embodiment of the disclosure, a method may be provided for performing communication using a non-terrestrial network by the user equipment (UE). The method may include receiving, from a base station, HARQ operation enabling indication information for indicating whether to enable a HARQ operation, configuring an HARQ process based on the HARQ operation enabling indication information, and separately controlling the HARQ operation for a downlink signal according to the HARQ process configured whether to enable or disable the HARQ operation.

According to an embodiment of the disclosure, a method may be provided for performing communication using a non-terrestrial network by a base station. The method may include transmitting, to a user equipment (UE), HARQ operation enabling indication information for indicating whether to enable a HARQ process operation, transmitting, to a user equipment (UE), a downlink signal, and controlling not to monitor HARQ feedback information for the downlink signal when the HARQ operation is configured not to be performed according to the HARQ operation enabling indication information.

According to an embodiment of the disclosure, a UE may be provided for performing communication using a non-terrestrial network. The UE may include a receiver configured to receive, from a base station, HARQ operation enabling indication information for indicating whether to enable a HARQ process operation, and a controller configured to configure the HARQ process on the basis of the HARQ operation enabling indication information, and separately control the HARQ operation for a downlink signal according to whether the HARQ operation configured for each HARQ process is enabled or disabled.

According to an embodiment of the disclosure, a base station may be provided for performing communication using a non-terrestrial network. The base station may include a transmitter configured to transmit, to a user equipment (UE), HARQ operation enabling indication information for indicating whether to enable a HARQ process operation and transmit, to a user equipment (UE), a downlink signal, and a controller configured to control not to monitor HARQ feedback information for the downlink signal when it is configured not to perform the HARQ operation according to the HARQ operation enabling indication information.

Advantageous Effects

The embodiments may provide the method and the apparatus to perform communication using a non-terrestrial network between a user equipment (UE) and a base station.

BRIEF DESCRIPTION OF DRAWINGS

FIG. 11 is types of NTN platform.

FIG. 14 is a diagram for explaining LCID values for DL-SCH.

FIG. 15 is a diagram for explaining LCID values for UL-SCH.

MODE FOR CARRYING OUT THE INVENTION

Figure 1:
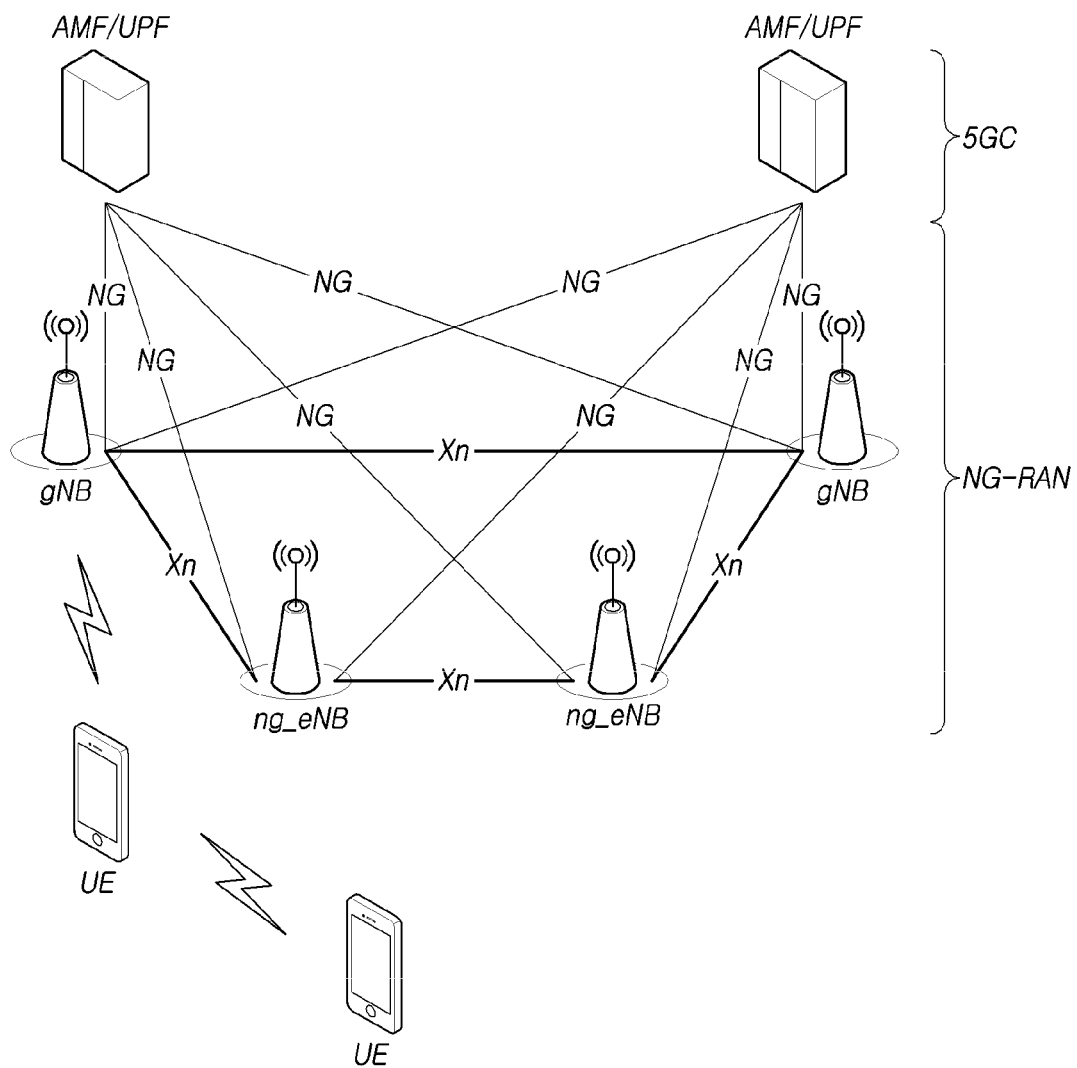
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. The OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
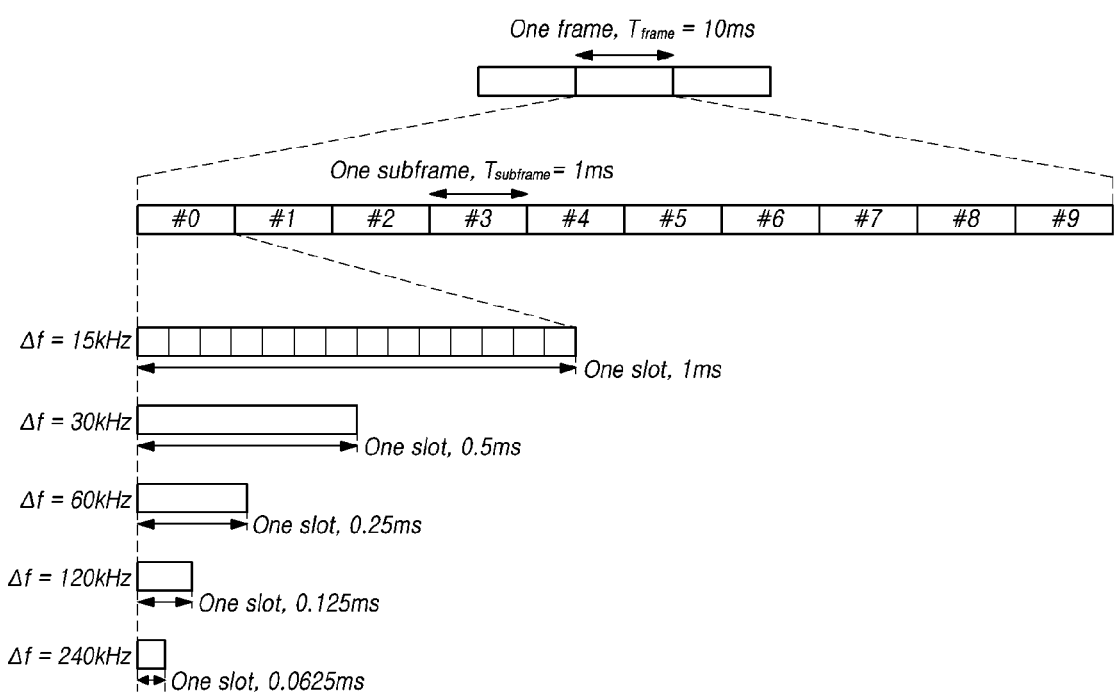
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing. NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a hybrid automatic repeat request (HARQ) delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by indicating, using the SFI, the index of a table configured through UE-specific RRC signaling. Further, the base station may dynamically indicate the slot format through downlink control information (DCI) or may statically or quasi-statically indicate the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port may be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
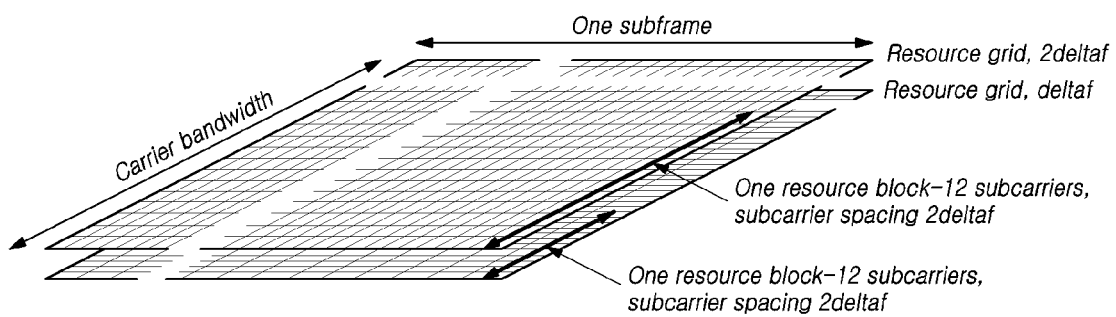
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
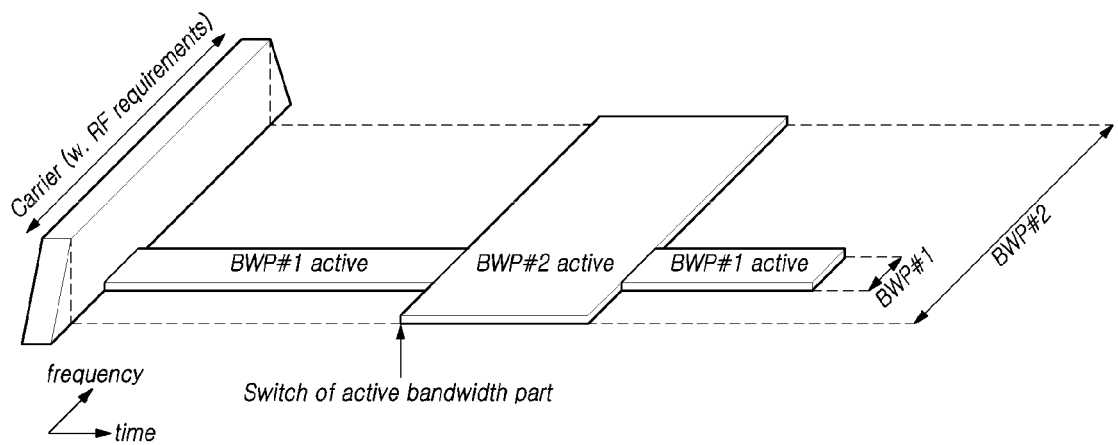
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
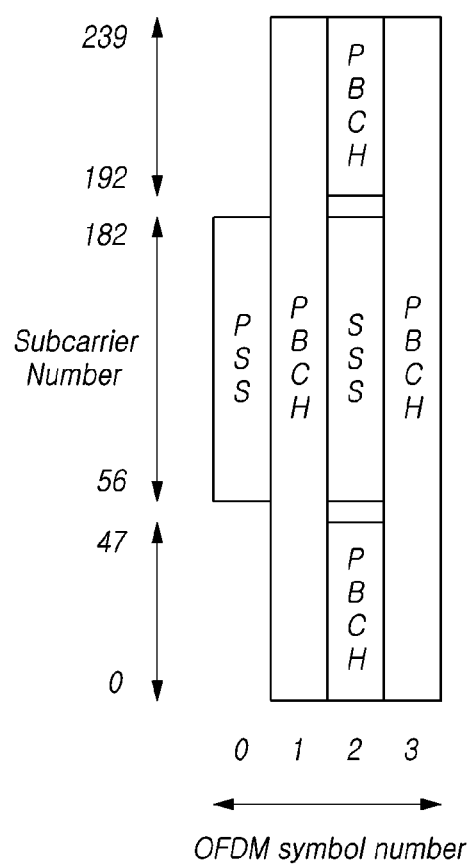
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a maydidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
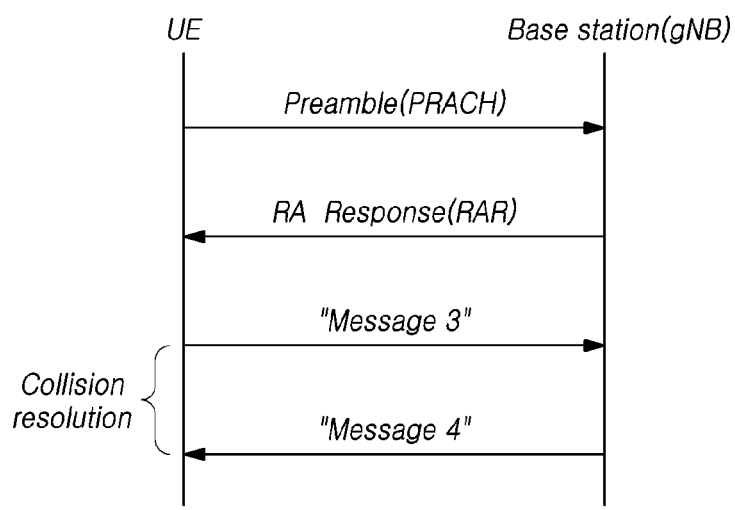
FIG. 6 is a signal diagram for explaining a random access procedure in a radio access technology in accordance with embodiments of the disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
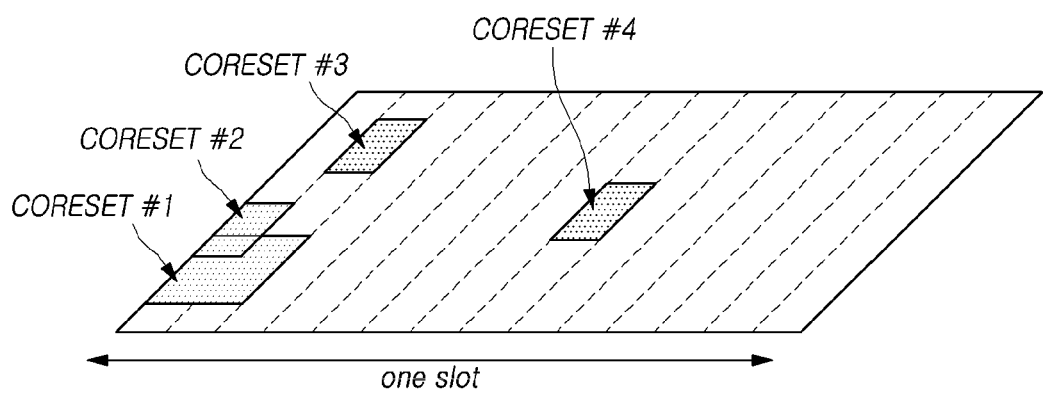
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., indicated, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

3GPP introduced NR, a next-generation wireless communication technology. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. The frame structure of the NR supports a frame structure based on multiple subcarriers. The basic subcarrier spacing (SCS) is 15 kHz, and a total of 5 SCS types are supported at 15 kHz*2^n.

Figure 8:
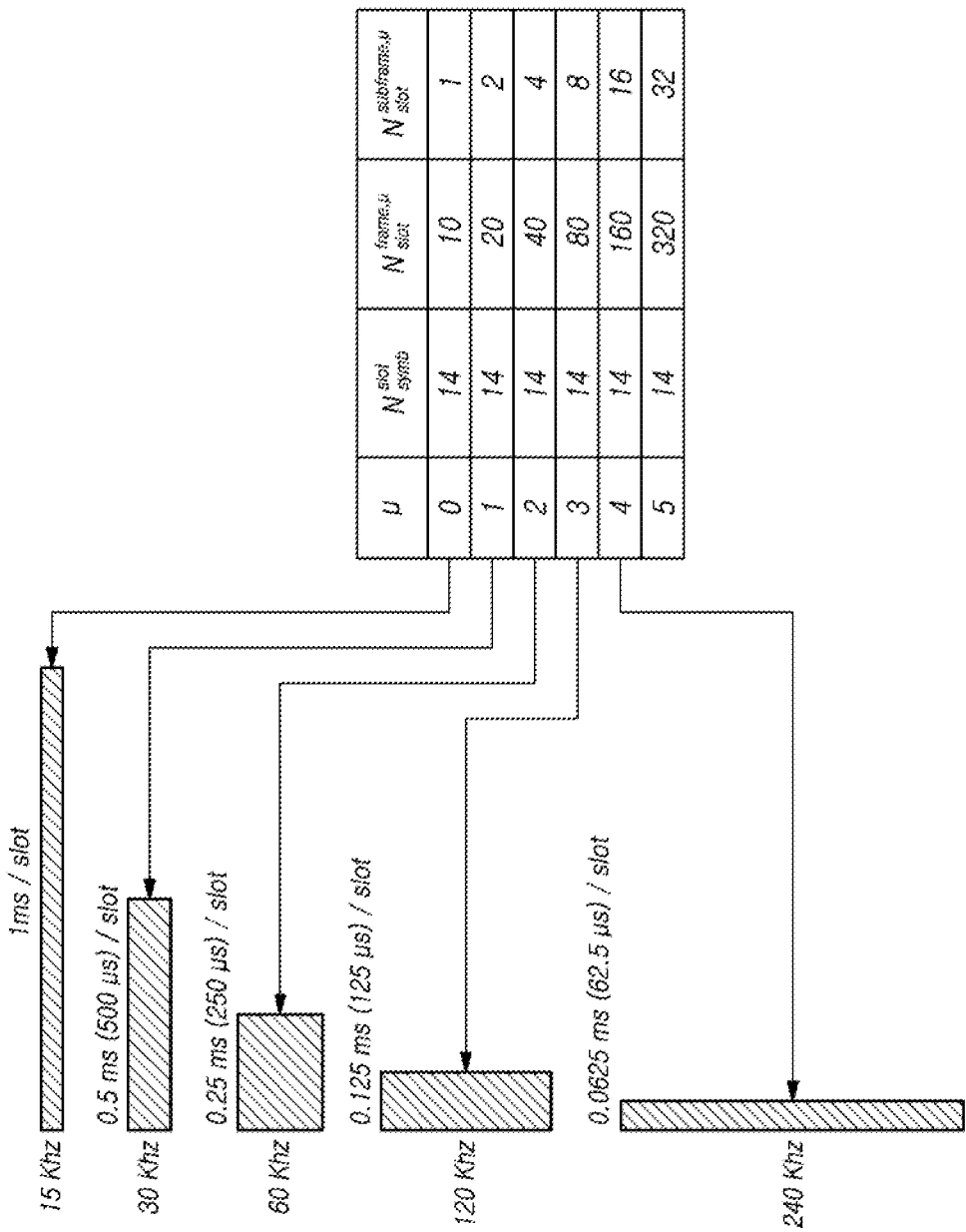
FIG. 8 is a view illustrating different subcarrier spacings arranged at a symbol level.

FIG. 8 is a view illustrating different subcarrier spacings arranged at a symbol level.

As shown in FIG. 8, the length of the time axis of the slot varies depending on the numerology. That is, the shorter the slot length, the larger the SCS. In this case, the number (y value) of OFDM symbols constituting a corresponding slot is determined to be 14 (e.g., y=14) regardless of the SCS value in the case of normal CP. Therefore, one slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be configured, or a long-length time-domain scheduling interval for uplink/downlink data transmission/reception may be configured via slot aggregation. In the case of transmission and reception of latency-sensitive data, such as URLLC, it is difficult to satisfy the latency requirements if scheduling is performed in slot units which are based on 1 ms (14 symbols) as defined in the numerology-based frame structure which has a small SCS value, e.g., 15 kHz. Thus, a mini-slot is defined to be constituted of a smaller number of OFDM symbols than the slot constituted of 14 symbols. Based thereupon, scheduling capable of meeting the URLLC requirements may be carried out.

In NR, the following structure is supported on the time axis. Unlike LTE, the basic scheduling unit is changed to the above described slot in NR. Also, regardless of the subcarrier spacing, a slot made up of 14 OFDM symbols. On the other hand, it supports a non-slot structure (mini-slot structure) composed of 2, 4, and 7 OFDM symbols, which are smaller scheduling units. The non-slot structure may be used as a scheduling unit for URLLC service.

Radio frame: Fixed 10 ms regardless of the numerology.

Subframe: Fixed 1 ms as a reference for time duration. It is not used for data/control scheduling unit, different from the LTE.

Slot: Mainly used for eMBB. It includes 14 OFDM symbols.

Non-slot (i.e. mini-slot): Mainly used for URLLC, but not limited to URLLC only. It includes 2, 4, or 7 OFDM symbols.

One TTI duration: A Time duration for data/control channel transmission. A number of OFDM symbols per a slot/non-slot in the time main.

NR HARQ (Hybrid ARQ)

Figure 9:
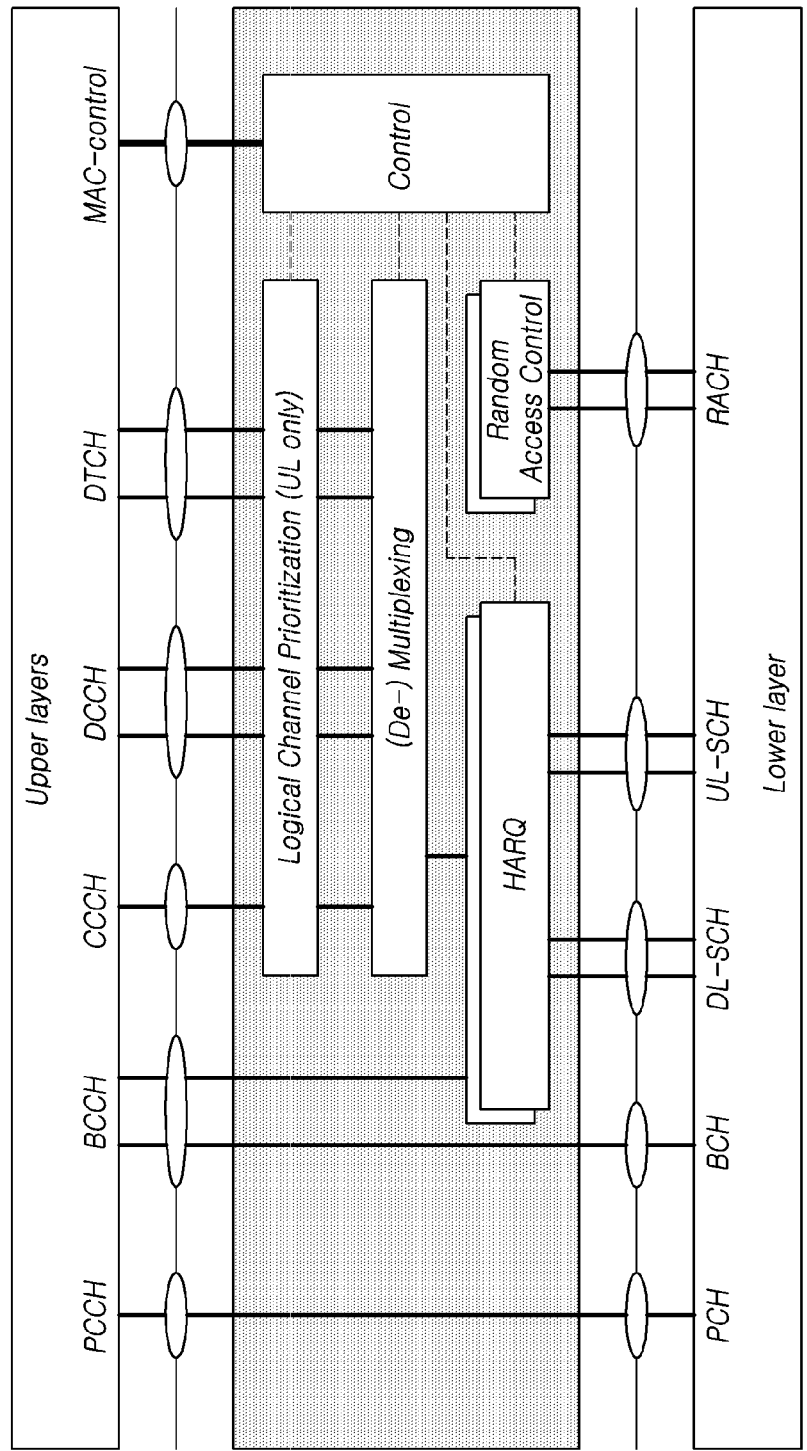
FIG. 9 illustrates an MAC structure in NR.

FIG. 9 illustrates an outline of an NR MAC structure. Referring to FIG. 9, asynchronous incremental redundancy Hybrid ARQ is supported in downlink transmission for the NR. The base station may provide the HARQ-ACK feedback timing to the UE dynamically in the DCI or semi-statically in the RRC configuration. According to the 3GPP TS 38.321 MAC specification, the MAC entity includes one HARQ entity for each serving cell, and each HARQ entity maintains 16 downlink HARQ processes (or processors). Each HARQ process is associated with a HARQ process identifier. The HARQ entity directs HARQ information and associated TBs received on the DL-SCH to the corresponding HARQ processes. HARQ functions to ensure delivery between the UE and the base station in the physical layer. According to the TS 38.321 MAC standard, the HARQ operation or HARQ procedure is as follows. First, in downlink transmission, uplink feedback or HARQ feedback is performed in response to downlink transmission/retransmission on the PUCCH or the PUSCH. Next, in uplink transmission, uplink HARQ retransmission may be triggered without waiting for feedback on previous transmission. Within a bundle, HARQ retransmissions are triggered without waiting for feedback from previous transmission according to pusch-AggregationFactor for a dynamic grant and repK for a configured uplink grant, respectively. For example, the base station may configure the number of transmissions (pusch-AggregationFactor) of one transport block in the UE through a bundle of dynamic scheduling. Alternatively, the base station may configure the number of transmissions (repK) of one transport block through a set of configured uplink grants. When the MAC entity is configured with pusch-AggregationFactor>1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle.

NR supports the asynchronous incremental redundancy Hybrid ARQ in the uplink transmission. The base station uses the uplink grant on the DCI to schedule the uplink transmission and the uplink retransmission. The MAC entity includes one HARQ entity for each serving cell, and each HARQ entity maintains 16 uplink HARQ processes (or processors).

Non-Terrestrial Network

The non-terrestrial network refers to a network or segment of a network that uses airborne vehicles such as HAPS (High Altitude Platform) or spaceborne vehicles such as satellites for transmission.

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites).

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

The 3GPP developed and introduced a technology that supports NR operation in the non-terrestrial network using the aforementioned satellite or air transport vehicle. However, in the non-terrestrial network, the distance between a base station and a UE is longer than that of a terrestrial network using a terrestrial base station. Accordingly, a very large round trip delay (RTD) may occur. For example, in an NTN scenario using GEO located at an altitude of 35,768 km, the RTD is known to be 544.751 ms, and in an NTN scenario using HAPS located at an altitude of 229 km, the RTD is known to be 3.053 ms. In addition, the RTD in the NTN scenario using the LEO satellite system may appear up to 25.76 ms. As described above, in order to perform a communication operation to which the NR protocol is applied in the non-terrestrial network, there is a demand of a technology for supporting the base station and the UE to perform the NR operation even under such propagation delay.

Figure 10:
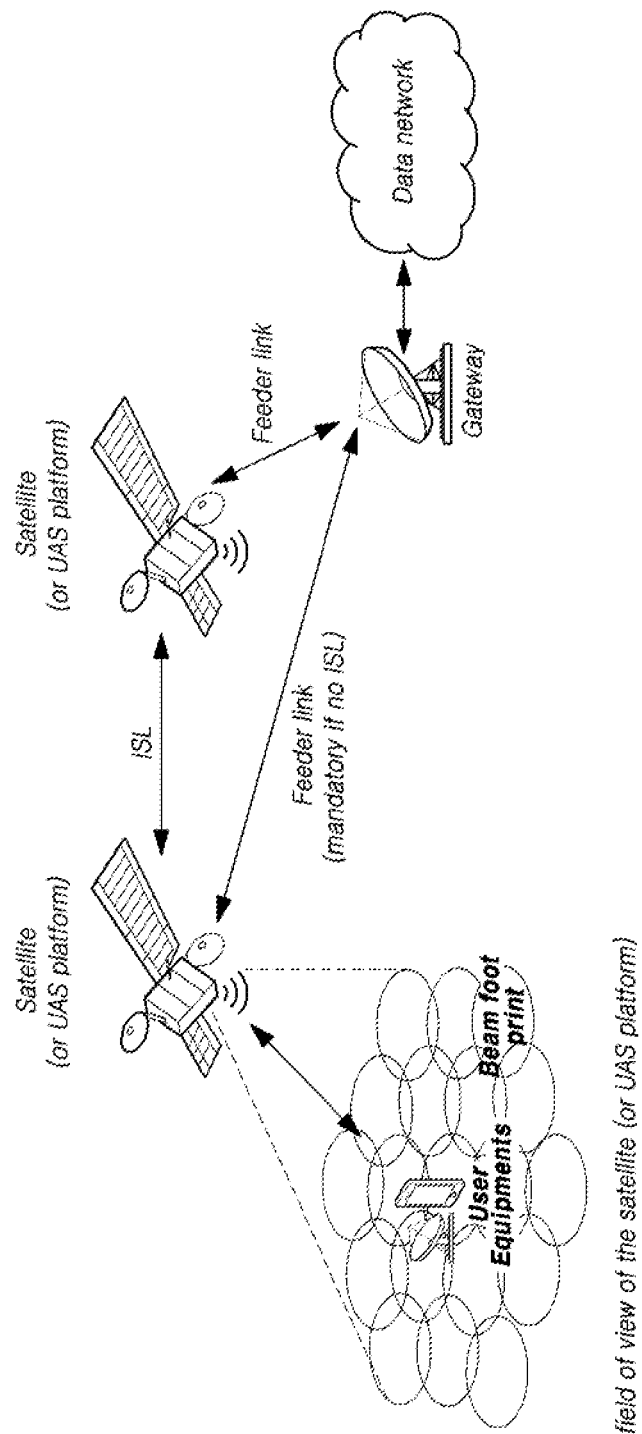
FIG. 10 illustrates an exemplary NTN scenario.

FIG. 10 exemplarily illustrates an NTN scenario to which the embodiments may be applied.

Referring to FIG. 10, the non-terrestrial network (NTN) may be implemented in various ways as follows.

Scenario A: Transparent GEO (NTN beam foot print fixed on earth)

Scenario B: Regenerative GEO (NTN beam foot print fixed on earth)

Scenario C1: Transparent LEO (NTN beam foot print fixed on earth)

Scenario C2: Transparent LEO (NTN beam foot print moving on earth)

Scenario D1: Regenerative LEO (NTN beam foot print fixed on earth)

Scenario D2: Regenerative LEO (NTN beam foot print moving on earth)

Here, a transparent payload or a regenerative payload is defined as follows.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

As shown in FIG. 10, the beam generated by the satellite generates multiple beams for a given service area bounded by the field of view of the satellite. In other words, the satellite (or UAS platform) generate beams typically generate several beams over a given service area bounded by its field of view. The footprint of the beam is typically elliptical.

FIG. 11 illustrates the type of NTN platform to which the embodiments may be applied.

FIG. 11 shows a typical beam footprint size for each type of NTN platform. For example, the LEO satellite has a beam size in the range of 100-500 km, and each satellite and UAS platform may have a different beam size according to the range and orbit of the operating altitude.

On the other hand, due to the distance between the UE and the satellite, if the NTN uses the NR HARQ procedure as it is, the packet may be delayed as HARQ stalling in the error correction process through the HARQ operation. For example, when HARQ operation is performed through 16 parallel HARQ processes provided in NR, a problem may occur due to packet delay. Meanwhile, it is difficult to increase the number of HARQ processes because an additional cost is required for the UE. In addition, the base station transmits the HARQ process ID to the UE through the DCI. In order to distinguish the HARQ process ID, more bits must be allocated to the DCI to distinguish the HARQ process ID.

The present disclosure is to solve this problem and introduces a method and apparatus for effectively transmitting and receiving data by controlling the HARQ operation through the non-terrestrial network.

In this disclosure, a HARQ control method based on the NR radio access technology is described as a reference. However, the embodiments may be also applied to any radio access technology. In addition, the embodiments are described based on the HARQ control method in the interface between the UE and the base station on the non-terrestrial network. However, the embodiments may be also applied to the HARQ control through the interface between the UE and the base station or the interface (e.g., PC5) between UEs on the terrestrial network. Even if the UE operation content related to the definition of the corresponding information element is not included in the disclosure, the corresponding content specified in the standard may be combined and performed in this embodiment. The embodiments described below may be implemented individually or by any combination of some or all of the respective embodiments.

On the other hand, the base station in the disclosure may mean a public entity such as a satellite that transmits and receives information to the UE in the NTN situation. Alternatively, the base station may refer to a terrestrial entity that transmits and receives data transmitted/received through an aerial entity such as the satellite. That is, the base station means an entity that transmits and receives the data to and from the UE in the NTN situation, and there is no limitation on the term. In addition, in the disclosure, a logical or functional entity performing the HARQ operation/procedure will be described as a HARQ processor or a HARQ process. That is, in the disclosure, the HARQ process and the HARQ processor may be understood to have the same meaning as necessary.

As described above, due to the limitation in the number of HARQ processes, the longer the distance between the UE and the satellite, such as GEO or MEO, the more difficult it may be to apply the typical HARQ operation or procedure. To this end, in the present disclosure, the HARQ operation of the UE may be controlled not to be performed. For convenience of explanation, controlling not to perform the HARQ operation may be expressed as HARQ turn off or HARQ disabling in the disclosure. This is only for convenience of explanation. Such an expression may be replaced with any functional terms or expression that control not to perform any HARQ operations such as HARQ disable, no Uplink HARQ feedback, HARQ feedback disable, no Uplink HARQ retransmission, HARQ uplink retransmission disable, etc. in the UE for downlink transmission. However, the embodiments are not limited to the functional terms or expression. On the other hand, the delay caused by the HARQ operation may not be significant in the case of the UAS platform and LEO. In addition, the HARQ operation has the advantage of a soft combining gain. Therefore, it is occasionally desirable to perform the HARQ operation (enable/turn on/Uplink HARQ feedback) even in the NTN. Accordingly, it may be necessary for the base station to selectively configure HARQ turn off/turn on to the UE.

Hereinafter, various embodiments of dynamically controlling the HARQ operation of UE by a base station and performing the HARQ operation by the UE according to the dynamical control of the base station will be described.

Figure 12:
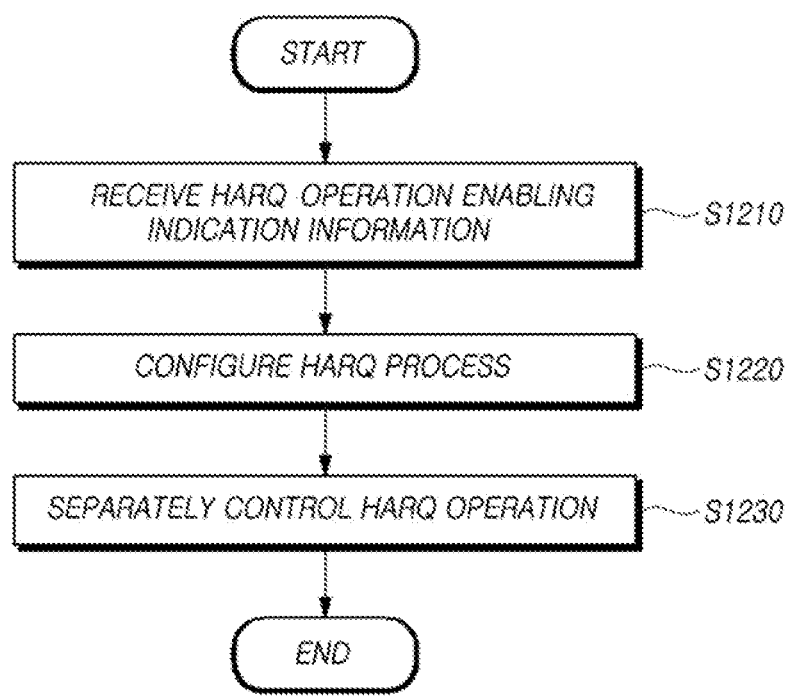
FIG. 12 is a flowchart for describing operations of a UE according to an embodiment.

FIG. 12 is a flowchart for describing operations of a UE according to an embodiment.

Referring to FIG. 12, a user equipment (UE) for performing communication using a non-terrestrial network may perform a step of receiving, from a base station, HARQ operation enabling indication information for indicating whether to enable a HARQ process operation at S1210.

For example, the HARQ operation enabling indication information may be received through higher layer signaling (ex, RRC connection reconfiguration message, etc.). Alternatively, the HARQ operation enabling indication information may be received through downlink control information or MAC CE.

According to an embodiment, the HARQ operation enabling indication information includes i) information indicating whether to enable the HARQ operation for each information of at least one of HARQ process identification information, ii) logical channel identification information (LCID), iii) radio bearer identification information, and iv) the downlink signaling channel information. According to another embodiment, the HARQ operation enabling indication information includes HARQ process identification information that indicates HARQ operation configured to be enabled or HARQ operation configured to be disabled, among the HARQ processes configured in the UE.

Specifically, the HARQ operation enabling indication information may include information indicating HARQ operation enabling for a specific UE. Alternatively, the HARQ operation enabling indication information may include HARQ process identification information for indicating whether to enable for each HARQ process configured in the UE. Alternatively, the HARQ operation enabling indication information may include information for indicating whether to enable the HARQ operation for each logical channel identification information. Alternatively, the HARQ operation enabling indication information may include information for indicating whether to enable the HARQ operation for each radio bearer. Alternatively, the HARQ operation enabling indication information may include information for indicating whether to enable the HARQ operation for each downlink signaling channel. For example, when the downlink signal is transmitted through the downlink data channel, the HARQ operation may be indicated to be disabled, and when the downlink signal is transmitted through the downlink control channel, the HARQ operation may be indicated to be enabled. The reverse is also possible.

In addition, whether to enable the HARQ operation may be indicated by any combination of the above-described information.

The HARQ operation enabling indication information may include HARQ process identification information that indicates HARQ operation configured to be enabled or HARQ operation configured to be disabled among the HARQ processes configured in the UE.

The UE may perform a step of configuring the HARQ process based on the HARQ operation enabling indication information at S1220. For example, the UE may configure the HARQ process of the UE as indicated by the HARQ operation enabling indication information. For example, the UE may configure not to perform the HARQ operation on the downlink signal in the case of the HARQ process indicated as disabling. Alternatively, in the case of an enabling-indicated HARQ process, the HARQ operation may be configured to be performed.

According to another embodiment, when each logical channel or radio bearer is indicated as enabled, the UE may allocate and configure a logical channel or radio bearer indicated as disabled to a specific HARQ process of the UE or allocate and configure a logical channel or radio bearer indicated as enabled to another HARQ process thereof. That is, when it is instructed whether to enable the HARQ operation for each logical channel or radio bearer, the UE may identify or distinguish each HARQ process and process the corresponding logical channel or radio bearer based on the identified HARQ process.

When the HARQ operation is indicated as disabled, the corresponding HARQ process may be determined by various methods such as a disabling-only dedicated HARQ process, a broadcast HARQ process, a newly defined HARQ process, a default HARQ process, and the HARQ process indicated by the HARQ operation enabling indication information.

The UE may perform a step of separately controlling the HARQ operation for a downlink signal according to whether each HARQ process is configured whether to enable or disable the HARQ operation at S1230.

For example, the UE may control not to transmit HARQ feedback information for the downlink signal when the HARQ process configured to disable the HARQ operation, at the step of the controlling the HARQ operation. In addition, the UE may control the HARQ operation in the HARQ process configured to disable the HARQ operation regardless of HARQ process identification information designated through the downlink control information of the downlink signal when the downlink signal is configured not to perform the HARQ operation according to the HARQ operation enabling indication information.

Specifically, even if the HARQ process identification information is allocated by the downlink control information, the UE does not perform the HARQ operation when the HARQ process is indicated to disable the HARQ operation by the HARQ operation enabling indication information. To this end, the UE may control to process the corresponding downlink signal in the HARQ process configured so that the HARQ operation is not performed in the UE, rather than the HARQ process identification information allocated by the downlink control information. That is, the HARQ operation is not performed on the corresponding downlink signal. Here, the HARQ process configured not to perform the HARQ operation may be configured or indicated in various forms, such as the default HARQ process, the dedicated HARQ process, and the broadcast HARQ process, as described above.

Through the above operation, it is possible to dynamically indicate the UE whether to perform the HARQ operation through various conditions in the NTN environment, thereby preventing unnecessary HARQ feedback or retransmission operation. In addition, it is possible to improve efficiency by controlling necessary HARQ feedback or retransmission operation to be performed.

Figure 13:
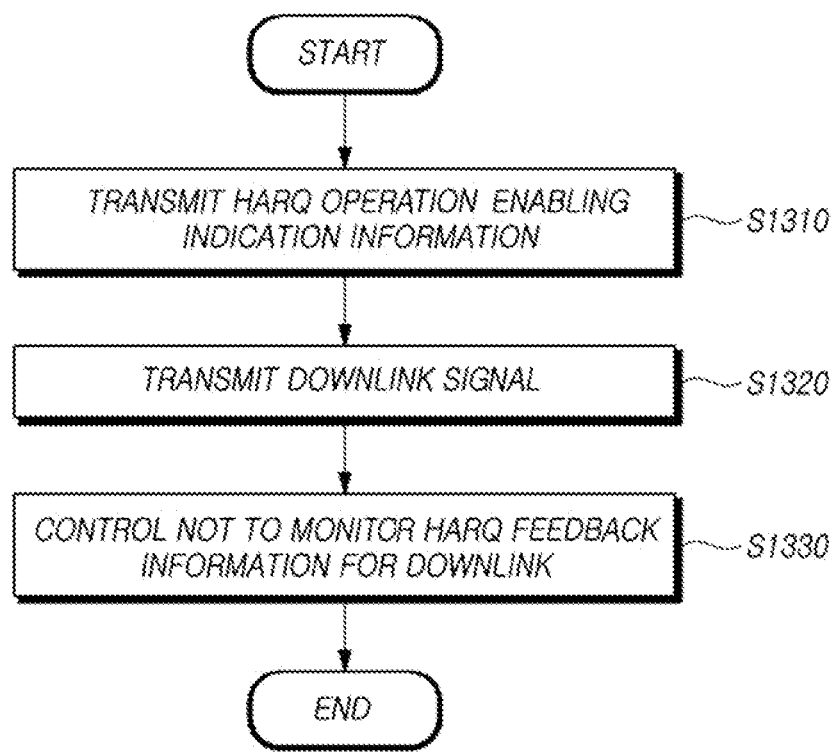
FIG. 13 is a flowchart for describing operations of a base station according to an embodiment.

FIG. 13 is a flowchart for describing operations of a base station according to an embodiment.

Referring to FIG. 13, a base station performing communication using a non-terrestrial network (NTN) may perform a step of transmitting, to a user equipment (UE), hybrid automatic repeat request (HARQ) operation enabling indication information for indicating whether to enable a HARQ operation at S1310.

The HARQ operation enabling indication information may be transmitted through higher layer signaling (ex, radio resource control (RRC) connection reconfiguration message, etc.). Alternatively, the HARQ operation enabling indication information may be transmitted through downlink control information or medium access control (MAC) control element (CE).

According to an embodiment, the HARQ operation enabling indication information includes information indicating whether to enable the HARQ operation for each information of at least one of HARQ process identification information, logical channel identification information (LCID), radio bearer identification information, and the downlink signaling channel information. According to another embodiment, the HARQ operation enabling indication information includes HARQ process identification information that indicates whether a HARQ process configured to enable or disable the HARQ operation among the HARQ processes configured in the UE.

Specifically, the HARQ operation enabling indication information may include information indicating HARQ operation enabling for a specific UE. Alternatively, the HARQ operation enabling indication information may include HARQ process identification information for indicating whether each HARQ process is configured to enable in the UE. Alternatively, the HARQ operation enabling indication information may include information for indicating whether to enable the HARQ operation for each logical channel identification information. Alternatively, the HARQ operation enabling indication information may include information for indicating whether to enable the HARQ operation for each radio bearer. Alternatively, the HARQ operation enabling indication information may include information for indicating whether to enable the HARQ operation for each downlink signaling channel. For example, when the downlink signal is transmitted through the downlink data channel, the HARQ operation may be indicated to be disabled, and when the downlink signal is transmitted through the downlink control channel, the HARQ operation may be indicated to be enabled. The reverse thereof may be also possible.

In addition, whether to enable the HARQ operation may be indicated by any combination of the above-described information.

The HARQ operation enabling indication information may include HARQ process identification information indicating a HARQ process configured whether to enable or disable the HARQ operation, among the HARQ processes configured in the UE.

The base station may perform a step of transmitting, to the user equipment (UE), a downlink signal at S1320.

The base station transmits the downlink signal when an event of downlink signal transmission to the UE occurs. For example, the base station may transmit downlink control information through a downlink control channel and transmit downlink data information through a downlink data channel. Alternatively, the base station may transmit the uplink grant information to the UE through the downlink control channel. In addition, the base station may transmit necessary control information and data information to the UE, and there is no limitation on downlink signals and information transmitted by the base station.

The base station may perform a step of controlling not to monitor HARQ feedback information for the downlink signal when the HARQ operation is configured not to be performed according to the HARQ operation enabling indication information at S1330.

When the base station indicates the UE to configure the HARQ operation as disabled and the base station transmits a downlink signal to the UE, the base station does not expect to receive the HARQ feedback information for the downlink signal. That is, the base station does not monitor the HARQ feedback information for the corresponding downlink signal.

The downlink signal which the base station does not monitor the HARQ feedback information may be configured by each UE, by logical channel, by radio bearer, by transmission channel, or by a combination of two or more according to the above-described HARQ enabling indication information. Accordingly, the base station may recognize whether HARQ feedback information of the corresponding downlink signal is monitored when transmitting the downlink signal.

For example, the UE may control not to transmit the HARQ feedback information for the downlink signal in the case of the HARQ process configured to disable the HARQ operation, at the step of the controlling the HARQ operation. In addition, the UE may control the HARQ operation in the HARQ process configured to disable the HARQ operation regardless of HARQ process identification information designated through the downlink control information of the downlink signal when the downlink signal is configured not to perform the HARQ operation according to the HARQ operation enabling indication information. Here, the HARQ process configured not to perform the HARQ operation may be configured or indicated by the base station in various forms, such as the default HARQ process, the dedicated HARQ process, and the broadcast HARQ process, as described above.

Through the above operation, it is possible to dynamically indicate the UE whether to perform the HARQ operation through various conditions in the NTN environment, thereby preventing unnecessary HARQ feedback or retransmission operation. In addition, it is possible to improve efficiency by controlling necessary HARQ feedback or retransmission operation to be performed.

Hereinafter, various operations that may be performed by the UE and the base station with reference to FIGS. 12 and 13 will be separately described in each embodiment. Each embodiment may be applied individually or in any combination.

First, an embodiment that a base station indicates whether to enable a HARQ operation through HARQ operation enabling indication information will be described.

For example, the base station configures HARQ disabling/enabling (or HARQ turn off/turn on) in the UE through an RRC message (e.g. RRC reconfiguration). In this case, the base station may indicate the HARQ enabling/ disabling by distinguishing LCIDs for each logical channel according to the attribute of service traffic to be transmitted. FIG. 14 is a diagram for explaining LCID values for DL-SCH. FIG. 15 is a diagram for explaining LCID values for UL-SCH. Referring to FIGS. 14 and 15, as an example, the base station may enable the HARQ operation for data (e.g. SRB0) from the UL-CCCH. As another example, the HARQ operation may be enabled for any MAC CE (e.g. C-RNTI AC CE). As still another example, the HARQ operation may be disabled for any general SRB (SRB1/SRB2/SRB3)/DRB. In this case, indication information for indicating each example may be defined and included in the RRC message (RLC-BearerConfig, LogicalChannelConfig, or PhysicalCellGroupConfig) including HARQ operation enabling indication information.

For another example, when the base station configures the HARQ enabling/disabling in the UE through the RRC message (e.g., RRC reconfiguration), the base station may indicate by distinguishing the identifier according to the attribute of service traffic to be transmitted, radio bearer for each logical channel HARQ enabling/disabling. As an example, the HARQ operation may be enabled for signaling radio bearer data having any srb-Identity (or any SRB among SRB1, SRB2, and SRB3 except for SRB0). As another example, the HARQ operation may be disabled for data radio bearer data having an arbitrary drb-Identity (or data radio bearer). As still another example, the HARQ operation may be enabled/disabled for each logical Channel Group. Indication information for indicating each example may be defined and included in the RRC message (e.g., RLC-BearerConfig, in another example, LogicalChannelConfig, in another example, PhysicalCellGroupConfig).

For another example, when the base station configures the HARQ enabling/disabling in the UE through the RRC message (e.g., RRC reconfiguration), the base station may indicate HARQ enabling/disabling by distinguishing physical channel/arbitrary information included in the physical channel according to the attribute of the service traffic to be transmitted.

As another example, the HARQ operation enabling indication information may include information indicating whether to enable the HARQ operation UE-specifically. That is, all HARQ processes configured in the corresponding UE may disable uplink HARQ feedback for downlink transmission. Alternatively, all HARQ processes configured in the corresponding UE may disable uplink HARQ retransmission.

In addition, as described above, the HARQ operation enabling indication information may be transmitted through downlink control information or MAC CE. In addition, the HARQ operation enabling indication information may indicate whether to enable the HARQ operation for each UE. Alternatively, the HARQ operation enabling indication information may indicate whether to enable the HARQ operation through any combination of each of the above-described examples.

Hereinafter, an operation when the HARQ operation enabling indication information indicates whether the HARQ operation is enabled will be described by the various embodiments.

Embodiment: HARQ Process Definition/Default HARQ Process ID Indication/HARQ Process ID Set Indication for HARQ Disabling-Based Data Transmission When the HARQ enabling/disabling according to the above-described logical channel is configured, the base station and the UE may not perform HARQ operation on data (e.g., user data, control data) for which HARQ disabling is configured. Alternatively, some HARQ operations may not be performed. For example, the UE may not transmit uplink HARQ feedback information for downlink transmission. For another example, the UE may not perform uplink HARQ retransmission.

In order to perform the operation while minimizing the change of the typical HARQ protocol specification, a procedure for HARQ disabling-based data processing must be defined between the UE and the base station.

For example, a dedicated HARQ process (e.g., processor) for processing data to be transmitted/received based on HARQ disabling may be defined. This may be an existing dedicated broadcast HARQ process, or a new dedicated HARQ process distinguished from the HARQ process associated with the existing HARQ process ID. In the typical NR technology, for the downlink, the maximum number of HARQ processes per cell supported by the UE is 16, and for the uplink, the number of HARQ processes per cell supported by the UE is 16. Each HARQ process is associated with one HARQ process identifier. For reference, HARQ information for DL-SCH or UL-SCH may include New Data Indicator (NDI), Transport Block size (TBS), Redundancy Version (RV), and HARQ process ID. The HARQ information is included in the DCI and indicated to the UE. If a dedicated HARQ process for processing data to be transmitted/received is defined based on HARQ disabling, HARQ information may be provided through a typical DCI format or a newly defined DCI format. In addition, the HARQ process ID for the dedicated HARQ process may be indicated by a specific value. In this case, even if a HARQ process ID value is included in the DCI, data to be transmitted/received based on HARQ disabling may be delivered to a dedicated HARQ process. Alternatively, information for distinguishing may be included in the DCI. For the HARQ process for HARQ disabling, the MAC entity of the UE does not indicate the physical layer to generate an acknowledgment such as HARQ ACK for data in the corresponding transport block (TB). Alternatively, for the corresponding HARQ process, the MAC entity of the UE indicates the physical layer not to generate the acknowledgment such as the HARQ ACK for the data in the corresponding TB. Alternatively, for the corresponding HARQ process, the MAC entity of the UE may prevent the physical layer from triggering uplink HARQ retransmission for the data in the corresponding TB. Alternatively, for the corresponding HARQ process, the MAC entity of the UE may prevent the physical layer from performing the uplink HARQ retransmission on the data in the corresponding TB. Alternatively, for the corresponding HARQ process, the MAC entity of the UE may ignore the uplink grant for uplink HARQ retransmission for the data in the TB corresponding to the physical layer.

As another example, in order to process data to be transmitted and received based on HARQ disabling, a dedicated broadcast HARQ process used for the broadcast channel such as the BCCH may be utilized. If the dedicated broadcast HARQ process for processing the data to be transmitted/received based on the HARQ disabling is used, HARQ information for this may be provided through a typical DCI format or a new DCI format. The HARQ process ID for the dedicated broadcast HARQ process may be indicated as a specific value, and even if an arbitrary HARQ process ID value is included in the DCI, the data to be transmitted/received based on the HARQ disabling may be delivered to the dedicated broadcast HARQ process. Alternatively, information for distinguishing may be included in the DCI.

As another example, a default HARQ process for processing the data to be transmitted and received based on the HARQ disabling may be defined/designated/indicated. To this end, the base station may indicate to the UE the HARQ process ID to be used as the default HARQ process through the RRC message. Alternatively, the default HARQ process may be specified as a fixed value in the standard and pre-configured in the UE and the base station. The HARQ information may be provided through the typical DCI format or may be provided by defining a new DCI format. When the DCI includes a HARQ process ID value designated/indicated as a default HARQ process, the UE processes the data to be transmitted/received based on the HARQ disabling. For example, for the corresponding HARQ process, the MAC entity of the UE does not indicate the physical layer to generate an acknowledgment such as HARQ ACK for data in the corresponding TB or indicates not to generate the acknowledgment such as the HARQ ACK for data in the TB. If the DCI includes a HARQ process ID value other than the HARQ process ID value designated/indicated as the default HARQ process, the UE performs the existing HARQ operation. Alternatively, for the corresponding HARQ process, the MAC entity of the UE may prevent the physical layer from triggering uplink HARQ retransmission for the data in the corresponding TB. Alternatively, for the corresponding HARQ process, the MAC entity of the UE may prevent the physical layer from performing uplink HARQ retransmission on data in the corresponding TB. Alternatively, for the corresponding HARQ process, the MAC entity of the UE may ignore the uplink grant for uplink HARQ retransmission for the data in the TB corresponding to the physical layer.

For another example, a HARQ process ID set/list for processing the data to be transmitted/received based on the HARQ disabling may be defined/designated/indicated. To this end, the base station may indicate to the UE the HARQ process ID set/list for processing the data to be transmitted/received based on the HARQ disabling through the RRC message. Alternatively, the HARQ process ID set/list may be pre-configured in the UE and the base station by designating a set/list value fixed in the standard. The HARQ information may be provided through the typical DCI format or may be provided by defining a new DCI format. When the DCI includes a designated/indicated HARQ process ID value for processing the data to be transmitted/received based on the HARQ disabling, the UE processes the data to be transmitted/received based on the HARQ disabling. If the DCI includes the HARQ process ID value other than the designated/indicated HARQ process ID value, the UE performs the existing HARQ operation.

Embodiment: LCP (Logical Channel Prioritization) Restriction Application for Data to be Transmitted and Received Based on HARQ Enabling The base station may control an LCP (Logical Channel Prioritization) procedure for uplink transmission of the UE by configuring a restriction mapped for each logical channel in the RRC. Through this, it is possible to process data by distinguishing LCID/radio bearer identifiers for each logical channel and then enabling/disabling the HARQ operation. The HARQ operation enabling indication information may indicate whether to enable the HARQ operation by associating the HARQ process identification information with logical channel identification information or radio bearer identification information.

For example, the MAC entity may select the logical channel for data to be transmitted/received based on HARQ enabling for the uplink grant associated with the HARQ process ID for the data to be transmitted/received based on the HARQ enabling and execute the LCP procedure. The LCP procedure is a MAC procedure applied when new transmission is performed and is disclosed in the 3GPP TS 38.321, and detailed description thereof will be omitted. Meanwhile, information for indicating to perform the LCP procedure for HARQ enabling-based data may be included in logical channel configuration information of the RRC message.

For another example, at one time, one logical channel may operate only in one mode of the HARQ disabling or the HARQ enabling.

As another example, at one time, one logical channel may operate to support both the HARQ disabling and the HARQ enabling.

For another example, the MAC entity may select all of logical channels for the data to be transmitted and received based on the HARQ enabling and the HARQ disabling, for an uplink grant associated with the HARQ process ID for the data to be transmitted and received based on the HARQ enabling and perform the LCP procedure.

For another example, the MAC entity of the UE for the corresponding HARQ process may prevent the physical layer from triggering the uplink HARQ retransmission for the data in the corresponding TB. Alternatively, for the corresponding HARQ process, the MAC entity of the UE may prevent the physical layer from performing the uplink HARQ retransmission on the data in the corresponding TB. Alternatively, for the corresponding HARQ process, the MAC entity of the UE may ignore the uplink grant for uplink HARQ retransmission for the data in the TB corresponding to the physical layer.

Embodiment: LCP Restriction Application for Data to be Transmitted and Received Based on HARQ Disabling The base station may control the LCP procedure for the uplink transmission of the UE by configuring a restriction mapped for each logical channel in RRC. Through this, it is possible to process the data by distinguishing LCID/radio bearer identifiers for each logical channel and then enabling/disabling the HARQ operation. The HARQ operation enabling indication information may indicate whether to enable the HARQ operation by associating the HARQ process identification information with the logical channel identification information or radio bearer identification information.

For example, the MAC entity may select the logical channel for data to be transmitted/received based on HARQ disabling for the uplink grant associated a dedicated HARQ process/default HARQ process ID/HARQ process ID list for the data to be transmitted/received based on the HARQ enabling and execute the LCP procedure. Information for indicating this may be included in logical channel configuration information (e.g., Logicalchannelconfig) of the RRC message.

For another example, at one time, one logical channel may operate only in one mode of the HARQ disabling or the HARQ enabling.

As another example, at one time, one logical channel may operate to support both the HARQ disabling and the HARQ enabling.

For another example, the MAC entity may select all of logical channels for the data to be transmitted and received based on the HARQ enabling and the HARQ disabling, for an uplink grant associated with the HARQ process ID for the data to be transmitted and received based on the HARQ enabling and perform the LCP procedure.

For another example, for the corresponding HARQ process, the MAC entity of the UE may prevent the physical layer from triggering the uplink HARQ retransmission for the data in the corresponding TB. Alternatively, for the corresponding HARQ process, the MAC entity of the UE may prevent the physical layer from performing the uplink HARQ retransmission on the data in the corresponding TB. Alternatively, for the corresponding HARQ process, the MAC entity of the UE may ignore the uplink grant for the uplink HARQ retransmission for the data in the TB corresponding to the physical layer.

As described above, according to the present embodiments data may be effectively transmitted and received by distinguishing the service traffic for the UE serviced through the non-terrestrial network.

On the other hand, the UE may dynamically perform the HARQ process operation based on the type, characteristic, information, etc. of each downlink signal even if the HARQ operation is indicated to be disabled by the base station.

For example, even when the HARQ operation is configured in a disabled state according to the HARQ operation enabling indication information, the UE may dynamically determine whether to perform the HARQ operation based on information included in the downlink signal. Here, the downlink signal may mean a PDCCH including downlink control information or a PDSCH including downlink data and may mean various signals transmitted by the base station to the UE.

As an example, when the downlink signal includes information indicating enabling or disabling of downlink semi-persistent scheduling (SPS), the UE may determine to perform HARQ operation on the downlink signal. Alternatively, when information indicating enabling or disabling of the SPS is received, the UE may control the HARQ operation to be performed even though the HARQ operation is configured in the disabled state by the RRC message. Alternatively, when the information indicating SPS enabling or disabling is received, the UE may control so that the MAC CE including confirmation information confirming that the corresponding information has been received is transmitted to the base station.

As another example, when the downlink signal includes information indicating enabling or disabling of one or more configured uplink grants, the UE may decide to perform the HARQ operation for the downlink signal. The information indicating enabling or disabling of one or more uplink grants may mean uplink grant type 2. As described above, when the uplink grant type 2 is received, the UE may control the HARQ operation to be performed even though the HARQ operation is configured in a disabled state by the RRC message. Alternatively, when the uplink grant type 2 is received, the UE may control to transmit the MAC CE including confirmation information that confirms the corresponding information has been received to the base station.

As another example, when the downlink signal includes information indicating enabling or disabling of one or more SRS resources configured in the UE, or information indicating enabling or disabling of a channel state report, the UE may be decided to perform the HARQ operation on the downlink signal. As described above, when information indicating enabling or disabling of one or more SRS resources is received, the UE may control the HARQ operation to be performed even though the HARQ operation is configured in the disabled state by the RRC message. Similarly, when information indicating enabling or disabling of the channel state report is received, the UE may control the HARQ operation to be performed even though the HARQ operation is configured in the disabled state by the RRC message. Alternatively, when the UE receives the information indicating enabling or disabling of one or more SRS resources or the information indicating enabling or disabling of a channel state report, the UE may control to transmit the MAC CE including confirmation information that confirms the information has been received to the base station.

Meanwhile, when it is determined that the HARQ operation for the downlink signal is performed, the UE may transmit feedback information for the downlink signal to the base station.

For example, the feedback information for the downlink signal may be transmitted through the MAC CE including the acknowledgment information for the downlink signal. Alternatively, the feedback information for the downlink signal may be transmitted through the uplink control channel including HARQ feedback information generated as a result of the HARQ operation for the downlink signal. Whether to use the transmission using the MAC CE or the transmission using the uplink control channel may be determined according to the type of the downlink signal described above or may be determined by the control of the base station.

Hereinafter, hardware and software structural configuration of a UE and a base station capable of performing some or all of the operations of each of the above described embodiments will be described again.

Figure 16:
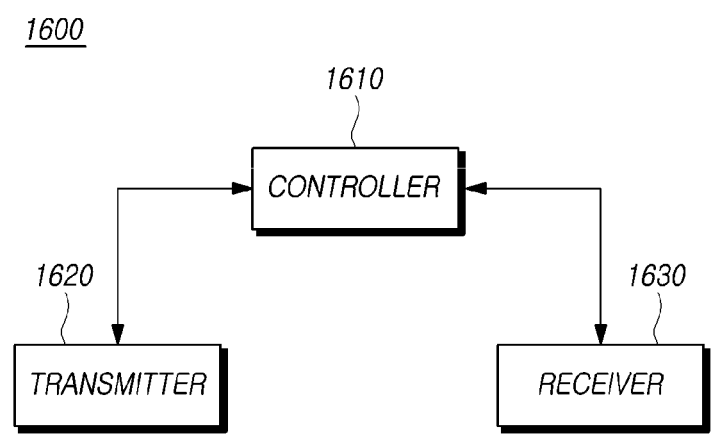
FIG. 16 is a block diagram illustrating a UE according to an embodiment.

FIG. 16 is a block diagram illustrating a UE according to an embodiment.

Referring to FIG. 16, a UE 1600 according to an embodiment performing communication using a non-terrestrial network may include a receiver 1630 configured to receive, from a base station, HARQ operation enabling indication information for indicating whether to enable a HARQ operation and a controller 1610 configured to configure a HARQ process based on the HARQ operation enabling indication information, and separately control the HARQ operation for a downlink signal according to each HARQ process configured whether to enable or disable the HARQ operation.

For example, the HARQ operation enabling indication information may be received through higher layer signaling (ex, RRC connection reconfiguration message, etc.). Alternatively, the HARQ operation enabling indication information may be received through downlink control information or MAC CE.

According to an embodiment, the HARQ operation enabling indication information includes information indicating whether to enable the HARQ operation for each information of at least one of HARQ process identification information, logical channel identification information (LCID), radio bearer identification information, and the downlink signaling channel information. According to another embodiment, the HARQ operation enabling indication information includes HARQ process identification information in which the HARQ operation is configured to be enabled or disabled, among the HARQ processes configured in the UE.

Specifically, the HARQ operation enabling indication information may include information indicating HARQ operation enabling for a specific UE. Alternatively, the HARQ operation enabling indication information may include HARQ process identification information for indicating each HARQ process configured whether to enable in the UE. Alternatively, the HARQ operation enabling indication information may include information for indicating whether to enable the HARQ operation for each logical channel identification information. Alternatively, the HARQ operation enabling indication information may include information for indicating whether to enable the HARQ operation for each radio bearer. Alternatively, the HARQ operation enabling indication information may include information for indicating whether to enable the HARQ operation for each downlink signaling channel. For example, when the downlink signal is transmitted through the downlink data channel, the HARQ operation may be indicated to be disabled, and when the downlink signal is transmitted through the downlink control channel, the HARQ operation may be indicated to be enabled. The reverse is also possible. In addition, whether to enable the HARQ operation may be indicated by any combination of the above-described information.

The HARQ operation enabling indication information may include HARQ process identification information that indicates an HARQ process configured whether to enable or disable the HARQ operation among the HARQ processes configured in the UE.

The controller 1610 may configure the HARQ process based on the HARQ operation enabling indication information. For example, the controller 1610 may configure the HARQ process of the UE as indicated by the HARQ operation enabling indication information. For example, the controller 1610 may configure not to perform the HARQ operation on the downlink signal in the case of the HARQ process indicated as disabling. Alternatively, the controller 1610 may configure to perform the HARQ operation in the case of the HARQ process indicated as enabling.

According to another embodiment, when enabling is indicated for each logical channel or radio bearer, the controller 1610 may allocate and configure a logical channel or radio bearer indicated as disabling to a specific HARQ process of the UE or allocate and configure a logical channel or radio bearer indicated as enabling to another HARQ process thereof. That is, when it is indicated whether to enable or disable the HARQ operation for each logical channel or radio bearer, the controller 1610 may separate or distinguish the HARQ process and configure the corresponding logical channel or radio bearer to be processed.

In this case, the HARQ process configured to disable the HARQ operation may be determined by various methods such as a disabling-only dedicated HARQ process, a broadcast HARQ process, a newly defined HARQ process, a default HARQ process, and the HARQ process indicated by the HARQ operation enabling indication information.

The controller 1610 may separately control the HARQ operation for a downlink signal according to the HARQ process each configured whether to enable or disable the HARQ operation. In addition, the controller 1610 may control the HARQ operation according to the HARQ process configured to enable or disable the HARQ operation regardless of HARQ process identification information designated through the downlink control information of the downlink signal when the downlink signal is configured not to perform the HARQ operation according to the HARQ operation enabling indication information.

Specifically, even if the HARQ process identification information is allocated by the downlink control information, the controller 1610 does not perform the HARQ operation when the HARQ process is indicated to be disabled by the HARQ operation enabling indication information. To this end, the controller 1610 may control to process the corresponding downlink signal in the HARQ process configured not to perform the HARQ operation in the UE, rather than the HARQ process identification information allocated by the downlink control information. That is, the HARQ operation is not performed on the corresponding downlink signal. Here, the HARQ process configured not to perform the HARQ operation may be configured or indicated in various forms, such as the default HARQ process, the dedicated HARQ process, and the broadcast HARQ process, as described above.

In addition to this, the controller 1610 controls the overall operation of the UE 1600 necessary for not operating HARQ through a non-terrestrial network while performing the HARQ operation in a predetermined situation, in the HARQ feedback control method necessary for performing the above-described embodiments.

The transmitter 1620 and the receiver 1630 are used to transmit or receive signals, messages, or data necessary for performing the above described embodiments, with the base station.

Figure 17:
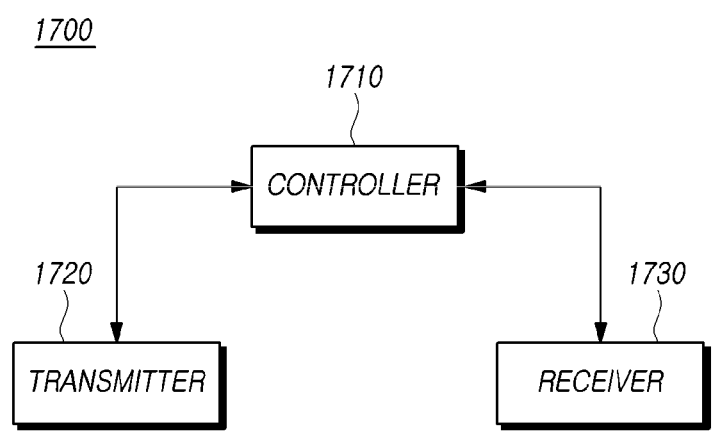
FIG. 17 is a block diagram illustrating a base station according to an embodiment.

FIG. 17 is a block diagram illustrating a base station according to an embodiment.

Referring to FIG. 17, a base station 1700 according to an embodiment performing communication using a non-terrestrial network with a user equipment (UE) may include a transmitter 1720 configured to transmit, to a user equipment (UE), HARQ operation enabling indication information for indicating whether to enable a HARQ operation and transmit, to a user equipment (UE), a downlink signal, and a controller 1710 configured to control not to monitor HARQ feedback information for the downlink signal when the HARQ operation is configured not to be performed according to the HARQ operation enabling indication information.

The HARQ operation enabling indication information may be transmitted through higher layer signaling. Alternatively, the HARQ operation enabling indication information may be transmitted through physical layer signaling such as downlink control information or MAC signaling such as MAC CE.

According to an embodiment, the HARQ operation enabling indication information includes information indicating whether to enable the HARQ operation for each information of at least one of HARQ process identification information, logical channel identification information (LCID), radio bearer identification information, and the downlink signaling channel information. According to another embodiment, the HARQ operation enabling indication information includes HARQ process identification information indicating an HARQ process configured whether to enable or disable the HARQ operation, among the HARQ processes configured in the UE.

The HARQ operation enabling indication information may be transmitted through higher layer signaling such as RRC connection reconfiguration message and the like. Alternatively, the HARQ operation enabling indication information may be transmitted through the downlink control information or the MAC CE.

According to an embodiment, the HARQ operation enabling indication information includes the information indicating whether to enable the HARQ operation for each information of at least one of HARQ process identification information, logical channel identification information (LCID), radio bearer identification information, and the downlink signaling channel information. According to another embodiment, the HARQ operation enabling indication information includes HARQ process identification information indicating an HARQ process configured whether to enable or disable the HARQ operation, among the HARQ processes configured in the UE.

Specifically, the HARQ operation enabling indication information may include information indicating HARQ operation enabling for a specific UE. Alternatively, the HARQ operation enabling indication information may include HARQ process identification information for indicating whether to enable for each HARQ process configured in the UE. Alternatively, the HARQ operation enabling indication information may include information for indicating whether to enable the HARQ operation for each logical channel identification information. Alternatively, the HARQ operation enabling indication information may include information for indicating whether to enable the HARQ operation for each radio bearer. Alternatively, the HARQ operation enabling indication information may include information for indicating whether to enable the HARQ operation for each downlink signaling channel. For example, when the downlink signal is transmitted through the downlink data channel, the HARQ operation may be indicated to be disabled, and when the downlink signal is transmitted through the downlink control channel, the HARQ operation may be indicated to be enabled. The reverse is also possible. In addition, whether to enable the HARQ operation may be indicated by any combination of the above-described information.

The HARQ operation enabling indication information may include HARQ process identification information indicating an HARQ process configured whether to enable or disable the HARQ operation among the HARQ processes configured in the UE.

The transmitter 1720 may transmit, to the user equipment (UE), a downlink signal when downlink signal is transmitted to the UE. For example, the transmitter 1720 may transmit downlink control information through a downlink control channel and transmit downlink data information through a downlink data channel. Alternatively, the base station may transmit the uplink grant information to the UE through the downlink control channel. In addition, the transmitter 1720 may transmit necessary control information and data information to the UE, and there is no limitation on downlink signals and information transmitted by the base station 1700.

The base station 1700 may control not to monitor HARQ feedback information for the downlink signal when the HARQ operation is configured not to be performed according to the HARQ operation enabling indication information. When the base station 1700 indicates the UE to configure the HARQ operation as disabling and transmits a downlink signal corresponding to the condition indicated for the UE, the base station does not expect to receive the HARQ feedback information for the downlink signal. That is, the base station 1700 may control not to monitor the HARQ feedback information for the corresponding downlink signal.

The downlink signal for which the base station 1700 does not monitor the HARQ feedback information may be configured by each UE, by logical channel, by radio bearer, by transmission channel, or by a combination of two or more according to the above-described HARQ enabling indication information. Accordingly, the base station 1700 may recognize whether HARQ feedback information of the corresponding downlink signal is monitored when transmitting the downlink signal.

For example, the UE may control not to transmit the HARQ feedback information for the downlink signal in the case of the HARQ process configured to disable the HARQ operation, at the step of the controlling the HARQ operation. In addition, the UE may control the HARQ operation in the HARQ process configured to disable the HARQ operation regardless of HARQ process identification information designated through the downlink control information of the downlink signal when the downlink signal is configured not to perform the HARQ operation according to the HARQ operation enabling indication information. Here, the HARQ process configured not to perform the HARQ operation may be configured or indicated by the station in various forms, such as the default HARQ process, the dedicated HARQ process, and the broadcast HARQ process, as described above.

In addition to this, the controller 1710 controls the overall operation of the base station 1700 necessary for not operating HARQ through a non-terrestrial network while performing the HARQ operation in a predetermined situation, in the HARQ feedback control method necessary for performing the above-described embodiments.

The transmitter 1720 and the receiver 1730 are used to transmit or receive signals, messages, or data necessary for performing the above described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:

1. A method for performing communication using a non-terrestrial network (NTN) by a user equipment (UE), the method comprising:
receiving, from a base station, hybrid automatic repeat request (HARQ) operation enabling indication information for indicating whether to enable a HARQ operation;
configuring a HARQ process based on the HARQ operation enabling indication information; and
separately controlling the HARQ operation according to the HARQ process configured based on the HARQ operation enabling indication information,
wherein the separately controlling the HARQ operation comprises controlling not to transmit an indication for generating acknowledgment of data in the transport block of a downlink signal from a medium access control (MAC) entity to a physical layer in the case of the HARQ process configured to disable the HARQ operation for the downlink signal.

2. The method of claim 1, wherein the HARQ operation enabling indication information comprises information indicating whether to enable the HARQ operation for each information of at least one of i) HARQ process identification information, ii) logical channel identification information (LCID), iii) radio bearer identification information, and iv) downlink signaling channel information.

3. The method of claim 1, wherein the HARQ operation enabling indication information comprises information indicating enabling or disabling of HARQ feedback for a downlink signal received in the HARQ process configured in the UE.

4. The method of claim 1, wherein the HARQ operation enabling indication information comprises information indicating enabling or disabling of HARQ retransmission for a uplink signal transmitted in the HARQ process configured in the UE.

5. A method for performing communication using a non-terrestrial network (NTN) by a base station, the method comprising:
transmitting, to a user equipment (UE), hybrid automatic repeat request (HARQ) operation enabling indication information for indicating whether to enable a HARQ operation;
transmitting, to the user equipment (UE), a downlink signal; and
controlling not to monitor HARQ feedback information for the downlink signal when the HARQ operation is configured not to be performed according to the HARQ operation enabling indication information,
wherein the UE controls not to transmit an indication for generating acknowledgment of data in the transport block of the downlink signal from a medium access control (MAC) entity to a physical layer in the case of the HARQ process configured to disable the HARQ operation for the downlink signal.

6. The method of claim 5, wherein the HARQ operation enabling indication information comprises information indicating whether to enable the HARQ operation for each information of at least one of HARQ process identification information, logical channel identification information (LCID), radio bearer identification information, and the downlink signaling channel information.

7. The method of claim 5, wherein the HARQ operation enabling indication information comprises information indicating enabling or disabling of HARQ feedback for the downlink signal received in the HARQ process configured in the UE.

8. The method of claim 5, wherein the HARQ operation enabling indication information comprises information for indicating a mapping restriction between the HARQ process and a logical channel.

9. A user equipment (UE) performing communication using a non-terrestrial network (NTN), the UE comprising:
a receiver configured to receive, from a base station, hybrid automatic repeat request (HARQ) operation enabling indication information for indicating whether to enable a HARQ operation; and
a controller configured to configure a HARQ process based on the HARQ operation enabling indication information, and separately control the HARQ operation according to the HARQ process configured based on the HARQ operation enabling indication information,
wherein the controller controls not to transmit an indication for generating acknowledgment of data in the transport block of a downlink signal from a medium access control (MAC) entity to a physical layer in the case of the HARQ process in which the HARQ operation for the downlink signal is configured to be disabled.

10. The UE of claim 9, wherein the HARQ operation enabling indication information comprises information indicating whether to enable the HARQ operation for each information of at least one of i) HARQ process identification information, ii) logical channel identification information (LCID), iii) radio bearer identification information, and iv) downlink signaling channel information.

11. The UE of claim 9, wherein the HARQ operation enabling indication information comprises information indicating enabling or disabling of HARQ feedback for a downlink signal received in the HARQ process configured in the UE.

12. The UE of claim 9, wherein the HARQ operation enabling indication information comprises information indicating enabling or disabling of HARQ retransmission for a uplink signal transmitted in the HARQ process configured in the UE.

13. The method of claim 1, wherein the HARQ operation enabling indication information is indicated in a radio resource control (RRC) message.

14. The method of claim 1, wherein the HARQ operation enabling indication information comprises information for indicating a mapping restriction between the HARQ process and a logical channel.

15. The method of claim 14, further comprising:

performing a logical channel priority procedure using the identification information of the HARQ process indicated by the information for indicating the mapping restriction.

16. The method of claim 15, wherein the performing a logical channel priority procedure includes, when the identification information of one or more HARQ processes for which mapping is restricted is associated with an uplink grant, selecting the logical channel whose mapping is restricted for the uplink grant.

* * * * *